(12) United States Patent
Huang

(10) Patent No.: US 9,008,468 B2
(45) Date of Patent: Apr. 14, 2015

(54) ELECTRO-OPTIC MODULATOR OF LARGE BANDWIDTH

(71) Applicant: Hon Hai Precision Industry Co., Ltd., New Taipei (TW)

(72) Inventor: Hsin-Shun Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 41 days.

(21) Appl. No.: 14/014,390

(22) Filed: Aug. 30, 2013

(65) Prior Publication Data
US 2014/0321794 A1  Oct. 30, 2014

(30) Foreign Application Priority Data

Apr. 25, 2013 (TW) .................................. 102114755

(51) Int. Cl.
  *G02B 6/32* (2006.01)
  *G02F 1/035* (2006.01)
(52) U.S. Cl.
  CPC ...................................... *G02F 1/035* (2013.01)
(58) Field of Classification Search
  CPC ......................................................... G02B 6/03
  USPC .............................................................. 385/3, 33
  See application file for complete search history.

(56) References Cited

U.S. PATENT DOCUMENTS

| | | | | |
|---|---|---|---|---|
| 4,491,384 | A * | 1/1985 | Yamashita et al. | 385/7 |
| 4,737,946 | A * | 4/1988 | Yamashita et al. | 369/44.12 |
| 5,070,488 | A * | 12/1991 | Fukushima et al. | 369/44.12 |
| 5,138,687 | A * | 8/1992 | Horie et al. | 385/129 |
| 5,195,070 | A * | 3/1993 | Shiba et al. | 369/44.12 |
| 5,276,743 | A * | 1/1994 | Penner et al. | 385/14 |
| 5,619,369 | A * | 4/1997 | Yamamoto et al. | 359/332 |
| 5,835,472 | A * | 11/1998 | Horie et al. | 369/110.02 |
| 5,917,980 | A * | 6/1999 | Yoshimura et al. | 385/129 |
| 6,307,996 | B1 * | 10/2001 | Nashimoto et al. | 385/130 |
| 6,385,355 | B1 * | 5/2002 | Nashimoto et al. | 385/8 |

* cited by examiner

*Primary Examiner* — Kaveh Kianni
(74) *Attorney, Agent, or Firm* — Novak Druce Connolly Bove + Quigg LLP

(57) ABSTRACT

An electro-optic modulator includes a substrate, a waveguide lens, a Y-shaped waveguide, and electrodes. The waveguide lens and the Y-shaped waveguide are formed in the substrate. The Y-shaped waveguide connects the waveguide lens and includes a first section dedicated for transmitting TE mode and a second section dedicated for transmitting TM mode. The electrodes are configured to modulate outputs of the waveguide lens, the first section, and the second section.

17 Claims, 5 Drawing Sheets

ELECTRO-OPTIC MODULATOR OF LARGE BANDWIDTH

BACKGROUND

1. Technical Field

The present disclosure relates to integrated optics and, particularly, to an electro-optic modulator having a wider bandwidth.

2. Description of Related Art

Electro-optic modulators are used in integrated optics to carry and transmit information. However, with the development of information technology, a bandwidth of current electro-optic modulators is often narrower than satisfactory.

Therefore, it is desirable to provide an electro-optic modulator that can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
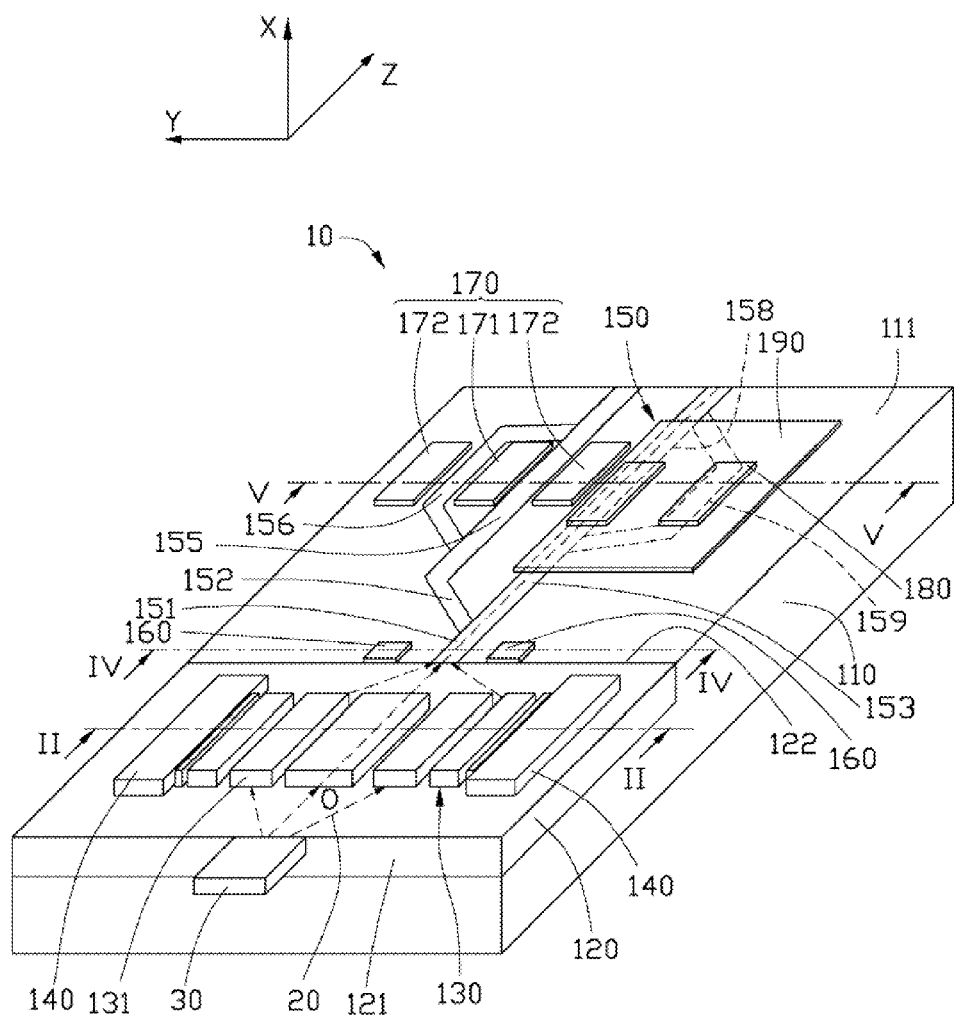
FIG. 1 is an isometric schematic view of an electro-optic modulator, according to an embodiment.

FIG. 1 shows an electro-optic modulator 10, according to an embodiment. The modulator 10 includes a substrate 110, a planar waveguide 120, a media grating 130, a pair of first electrodes 140, a Y-shaped waveguide 150, a pair of second electrodes 160, a group of third electrodes 170, and a pair of fourth electrodes 180.

The planar waveguide 120 is formed in the substrate 110 and includes a sidewall 121 and an interface 122 opposite to the sidewall 121. The sidewall 121 receives a laser beam 20 incident thereon and transmits along an optical axis O.

The media grating 130 is formed on the planar waveguide 120 and is symmetrical about the optical axis O. According to theory of integrated optics, effective indexes of parts of the planar waveguide 120 loaded with the media gratings 130 increase. As such, by properly constructing the media grating 130, the media grating 130 and the planar waveguide 120 can constitute and function as a diffractive waveguide lens to converge the laser beam 20.

Figure 2:
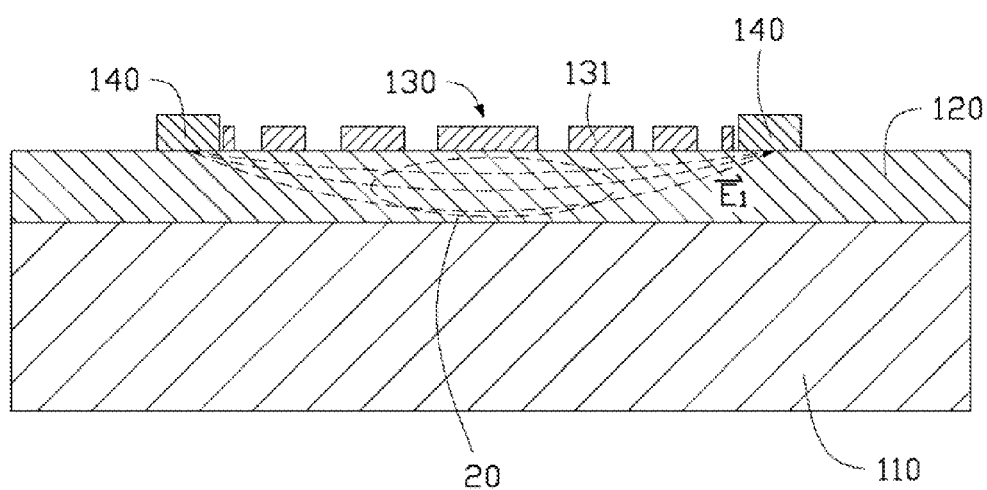
FIG. 2 is a cross-sectional view taken along a line II-II of FIG. 1.

The first electrodes 140 are positioned on the planar waveguide 120, at two opposite sides of the media grating 130, and are symmetrical about the optical axis O. The first electrodes 140 receive a first modulating voltage and generate a first modulating electric field $\overline{E_1}$ (see FIG. 2). The first modulating electric field $\overline{E_1}$ changes, utilizing electro-optic effect, an effective refractive index of the planar waveguide 13 and thus changes an effective focal length of the waveguide lens. Thus, convergence level of the laser beam 20 can be modulated and, in turn, an amount of the laser beam 20 entering the Y-shaped waveguide 150 (i.e., an output power of the waveguide lens) can be modulated by the first electrodes 140. That is, information can be modulated to the output power of the waveguide lens.

The Y-shaped waveguide 150 is formed on the substrate 110 and includes an input section 151 connecting with the interface 122 and extending along the optical axis O.

The Y-shaped waveguide 150 includes a first section 152 dedicated for transmitting traverse electric waves (TE mode) and a second section 153 dedicated for transmitting traverse magnetic waves (TM mode). That is, the first section 152 can only transmit the TE mode and can not transmit the TM mode, while the second section 153 can only transmit the TM mode and cannot transmit the TE mode. As such, crosstalk between the first section 152 and the second section 153 can be avoided. Due to birefringence effect, the TE mode and the TM mode traversing the input section 151 are separated at an intersecting point of the input section 151, the first section 152, and the second section 153.

The first section 152 is Y-shaped and includes a first branch 155 and a second branch 156. The second section 153 is Y-shaped and includes a third branch 158 and a fourth branch 159.

The second electrodes 160 are positioned on the substrate 110, at two opposite sides of the input section 151, and are symmetrical about the optical axis O. The second electrodes 160 receive a voltage and generate an electric field $\overline{E}$ (see FIG. 4). The electric field $\overline{E}$ changes, utilizing the electro-optic effect, an effective refractive index of the input section 151. According to the theory of the integrated optics, a phase shift of the TE mode cased by the electric field $\overline{E}$ is larger than that of the TM mode and, thus, the TE mode and the TM mode can be more efficiently separated at the intersecting point of the input section 151, the first section 152, and the second section 153.

The third electrodes 170 include a modulating electrode 171 and two ground electrodes 172, all of which are positioned on the substrate 110. The modulating electrode 171 is located between the first branch 155 and the second branch 156. The ground electrodes 172 are located at two opposite sides of the first section 152. The third electrodes 170 receive a second modulating voltage and generate a second modulating electric field $\overline{E_2}$ (see FIG. 5). The second modulating electric field $\overline{E_2}$ changes, utilizing the electro-optic effect, effective refractive indexes of the first branch 155 and the second branch 156. As such, a phase shift and interference level between lightwaves traversing the first branch 155 and the second branch 156 can be modulated, and thus an output power of the first section 152 can be modulated by the third electrodes 170. That is, additional information can be modulated to the output power of the first section 152.

The fourth electrodes 180 are positioned on the substrate 110 and cover the third branch 158 and the fourth branch 159, respectively. The fourth electrodes 180 receive a third modulating voltage and generates a third modulating electric field $\overline{E_3}$ (see FIG. 5). The third modulating electric field $\overline{E_3}$ changes, utilizing the electro-optic effect, effective refractive indexes of the third branch 158 and the fourth branch 159. As such, a phase shift and interference level between lightwaves traversing the third branch 158 and the fourth branch 159 can be modulated, and thus an output power of the second section 153 can be modulated by the fourth electrodes 180. That is, further additional information can be modulated to the output power of the second section 153.

Thus, information can be modulated to all of the waveguide lens, the first section 152, and the second section 153. As such, a bandwidth of the electro-optic modulator 10 is widened.

The laser beam 20 can be emitted by a laser light source 30 attached to the sidewall 121. The laser light source 30 can be a distributed feedback laser (DFB), which emits the laser beam 20 from a side surface and can be attached to the sidewall 121 using die bond technology such that the side surface contacts the sidewall 121. Of course, the laser light source 30 is not limited to this embodiment can be changed as needed in other embodiment.

The substrate 110 is made of lithium niobate crystal to increase a bandwidth of the modulator 10, as the lithium niobate crystal has a high response speed. In this embodiment, the substrate 110 is substantially rectangular and includes a top surface 111 perpendicularly connecting the sidewall 122. In other embodiments, the substrate 110 can be made of other suitable material.

The planar waveguide 120 is also rectangular and made by diffusing titanium into the top surface 111. As such, an upper surface of the planar waveguide 120 is the top surface 111. The refractive index of the planar waveguide 120 gradually changes when the media grating 130 is loaded due to material characteristics of the planar waveguide 120.

The media grating 130 can be made of lithium niobate crystal diffused with titanium or a high refractive film.

In this embodiment, the media grating 130 is a chirped grating and has an odd number of media strips 131. The media strips 131 are symmetrical about the optical axis O. The media strips 131 are rectangular and parallel with each other. In order from the optical axis O to each side, widths of the media strips 131 decrease, and widths of gaps between each two adjacent media strips 131 also decrease.

Figure 3:
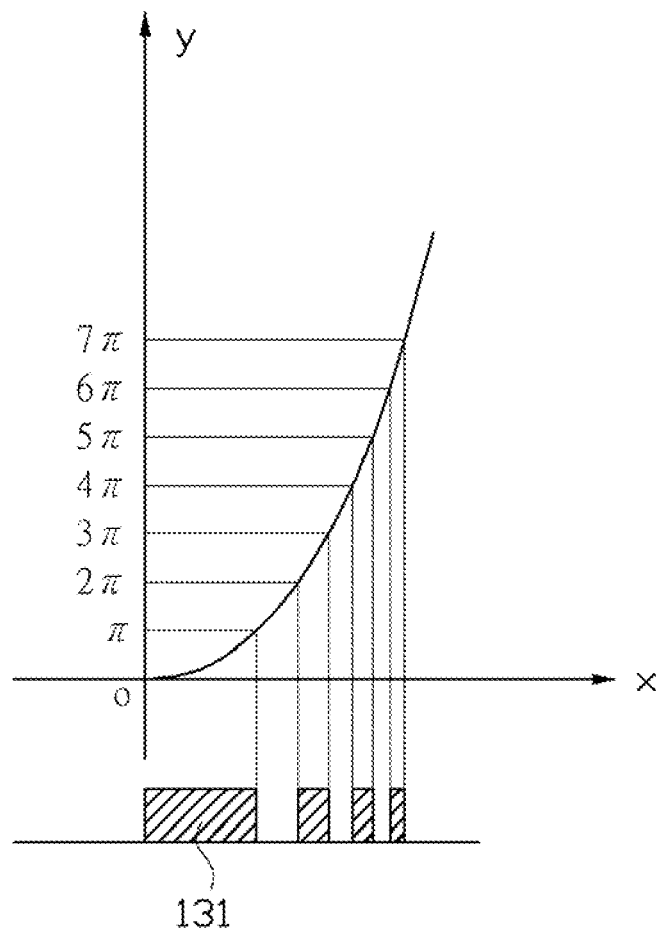
FIG. 3 is a schematic view of a media grating of the electro-optic modulator of FIG. 1.

FIG. 3 shows that a coordinate system "oxy" is established, wherein the origin "o" is an intersecting point of the optical axis O and a widthwise direction of the planar waveguide 13, "x" axis is the widthwise direction of the planar waveguide 13, and "y" axis is a phase shift of the laser beam 20 at a point "x". According to wave theory of planar waveguides, $y=a(1-e^{kx^2})$, wherein x>0, a, e, and k are constants. In this embodiment, boundaries of the media strips 131 are set to conform to conditions of formulae:

$$y_n = a(1 - e^{kx_n^2})$$

and $y_n = n\pi$, wherein $x^n$ is the nth boundary of the media strips 131 along the "x" axis, and $y_n$ is the corresponding phase shift. That is, $$x_n = \sqrt{\frac{\ln\left(1 - \frac{n\pi}{a}\right)}{k}} \quad (x_n > 0).$$

The boundaries of the media strips 131 where $x_n<0$ can be determined by characteristics of symmetry of the media grating 130.

The first electrodes 140 can be formed by coating a layer of copper on the planar waveguide 120. A length and height of the first electrodes 140 are equal to or larger than a length and height of the media grating 130, respectively.

The Y-shaped waveguide 150 is formed by diffusing titanium into the substrate 110. The first section 152 is further diffused with zinc-nickel alloy while the second section 153 is diffused with gallium.

The input section 151, the first branch 155, the second branch 156, the third branch 158, and the fourth branch 159 are arranged in parallel. The first branch 155 is positioned adjacent to the third branch 158. The second branch 156 and the fourth branch 159 are positioned at two opposite sides of the first branch 155 and the third branch 158.

In a coordinate system XYZ (see FIG. 1), wherein X axis is a vertical height of the substrate 110 (i.e., perpendicular to the top surface 111), Y axis is a horizontal width of substrate 110 (parallel with the top surface 111 and perpendicular to the optical axis O), and Z axis is a crossways length of the substrate 110 (i.e., along a direction that is parallel with the optical axis O), the TE mode has an electric field component $\vec{E_y}$ vibrating along the Y axis only. The TM mode has an electric field component $\vec{E_x}$ vibrating along the X axis and another electric field component $\vec{E_z}$ vibrating along the Z axis.

Figure 4:
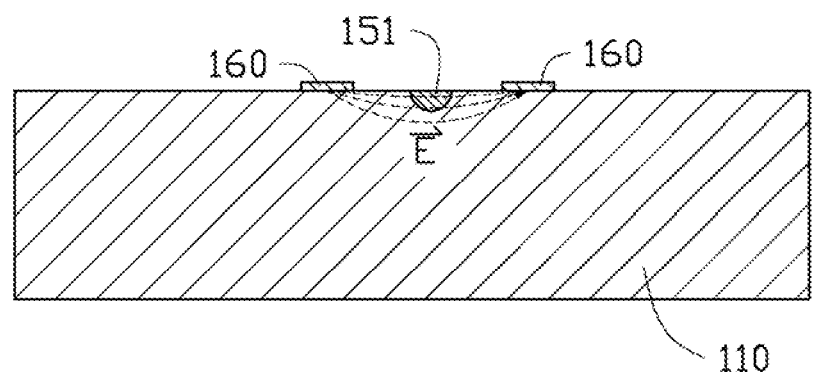
FIG. 4 is a cross-sectional view taken along a line IV-IV of FIG. 1.

FIG. 4 shows that a portion of the electric field $\vec{E}$ intersecting with the input section is substantially parallel with the Y axis. The refractive index changes significantly along the Y axis. This is why the phase shift of the TE mode (i.e., the electric field component $\vec{E_y}$) is greater than the phase shift of the TM mode.

The second electrodes 160 can be formed by coating a layer of copper on the substrate 110. The second electrodes 160 are rectangular and a length of each second electrode 160 is equal to or shorter than the input section 151.

Figure 5:
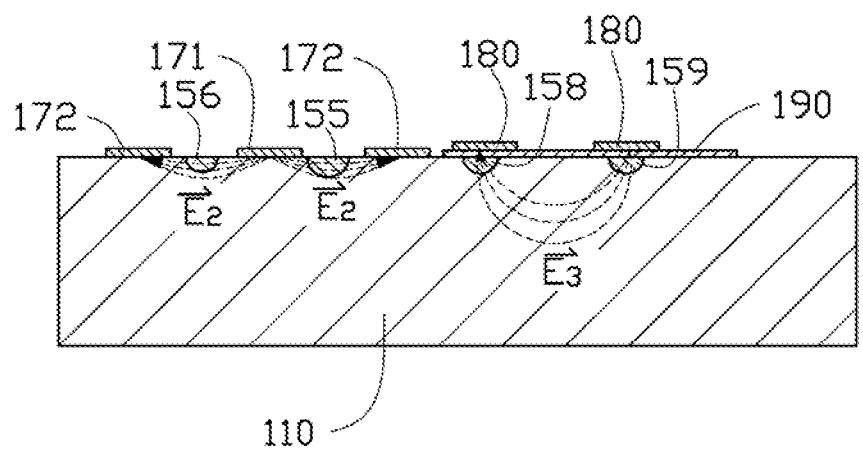
FIG. 5 is a cross-sectional view taken along a line V-V of FIG. 1.

FIG. 5 shows that portions of the second modulating electric field $\vec{E_2}$ intersecting with the first branch 155 and the second branch 156 is substantially parallel with the Y axis and thus can efficiently modulate the TE mode (i.e., the electric field component $\vec{E_y}$).

The third electrodes 170 can be formed by coating a layer of copper on the substrate 110. The third electrodes 170 are longer than or as long as the second branch 153. In this embodiment, the third electrodes 170 are as long as the second branch 153.

FIG. 5 also shows that portions of the third modulating electric field $\vec{E_3}$ intersecting with the third branch 158 and the fourth branch 159 is substantially parallel with the X axis and thus can efficiently modulate the TM mode (i.e., the electric field component $\vec{E_x}$).

The fourth electrodes 180 can be formed by coating a layer of copper on the substrate 110. The fourth electrodes 180 are longer than or as long as the fourth branch 159. In this embodiment, the fourth electrodes 180 are as long as the fourth branch 159.

To avoid the lightwaves traversing the third branch 158 and the fourth branch 159 from being absorbed by the fourth electrodes 180, the electro-optic modulator 10 further includes a buffer layer 190. The buffer layer 190 is sandwiched between the substrate 110 and the fourth electrodes 180 and can be made of silicon dioxide.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. An electro-optic modulator, comprising:
    a substrate;
    a planar waveguide formed in the substrate, the planar waveguide comprising a sidewall to receive a laser beam traversing along an optical axis and an interface opposite to the sidewall;
    a media grating loaded on the planar waveguide, the media grating and the planar waveguide constituting a waveguide lens to converge the laser beam;
    a pair of first electrode positioned on the planar waveguide to modulate an output of the waveguide lens by changing a refractive index of the planar waveguide;
    a Y-shaped waveguide formed in the substrate and comprising an input section connecting the interface to receive the laser beam, the Y-shaped waveguide further comprising a first section and a second section separating from the input section, the first section being dedicated for transmitting TE mode and comprising a first branch and a second branch, the second section being dedicated for transmitting TM mode and comprising a third branch and a fourth branch;
    three third electrodes comprising a modulating electrode and two ground electrodes, the modulating electrode positioned on the substrate and between the first branch and the second branch, the two ground electrodes positioned at two opposite sides of the first section, the modulating electrode and the ground electrodes being configured to modulate an output of the first section by changing refractive indexes of the first branch and the second branch; and
    a pair of fourth electrodes positioned on the substrate and covering the third branch and the fourth branch, respectively, the fourth electrodes being configured to modulate an output of the second section by changing refractive indexes of the third branch and the fourth branch.

2. The modulator of claim 1, wherein the substrate is made of lithium niobate crystal.

3. The modulator of claim 1, wherein the planar waveguide is made of lithium niobate diffused with titanium.

4. The modulator of claim 1, wherein the media grating is made of lithium niobate diffused with titanium.

5. The modulator of claim 1, wherein the media grating is a chirped grating.

6. The modulator of claim 1, wherein the media grating comprises an odd number of media strips extending along a direction that is substantially parallel with the optical axis, each of the media strips is rectangular, in this order from the optical axis to each side of the media grating, widths of the media strips decrease, and widths of gaps between each two adjacent media strips also decrease.

7. The modulator of claim 6, wherein a coordinate axis "ox" is established, wherein the origin "o" is an intersecting point of the optical axis and a widthwise direction of the planar waveguide, and "x" axis is the widthwise direction of the planar waveguide, boundaries of the media strips are set to conform condition formulae:

$$x_n = \sqrt{\frac{\ln\left(1 - \frac{n\pi}{a}\right)}{k}}, \text{ and } x_n > 0,$$

wherein $x_n$ is the nth boundary of the media strips along the "x" axis, and a and k are constants.

8. The modulator of claim 1, wherein a length and height of the first electrodes are equal to or larger than a length and height of the media grating, respectively.

9. The modulator of claim 1, wherein the input section is made of lithium niobate crystal diffused with titanium.

10. The modulator of claim 1, wherein the first section is made of lithium niobate crystal diffused with zinc-nickel alloy.

11. The modulator of claim 1, wherein the second section is diffused with gallium.

12. The modulator of claim 1, wherein the input section, the first branch, the second branch, the third branch, and the fourth branch are arranged in parallel, the first branch is positioned adjacent to the third branch, and the second branch and the fourth branch are positioned at two opposite sides of the first branch and the third branch.

13. The modulator of claim 1, wherein the third electrodes are longer than or as long as the second branch.

14. The modulator of claim 1, wherein the fourth electrodes are longer than or as long as the fourth branch.

15. The modulator of claim 1, comprising a buffer layer formed and sandwiched between the substrate and the fourth electrodes.

16. The modulator of claim 15, wherein the buffer layer is made of silicon dioxide.

17. The modulator of claim 1, further comprising a pair of second electrodes positioned on the substrate, at two opposite sides of the input section, and symmetrical about the optical axis.

* * * * *